United States Patent
Dubeyko et al.

(10) Patent No.: US 12,517,711 B2
(45) Date of Patent: Jan. 6, 2026

(54) COMPUTATION ARCHITECTURE SYNTHESIS

(71) Applicants: Lemon Inc., Grand Cayman (KY); Beijing Youzhuju Network Technology Co., Ltd., Beijing (CN)

(72) Inventors: Viacheslav Dubeyko, Los Angeles, CA (US); Jian Wang, Beijing (CN)

(73) Assignees: Lemon Inc., Grand Cayman (KY); Beijing Youzhuju Network Technology Co., Ltd., Beijing (CN)

(*) Notice: Subject to any disclaimer, the term of this patent is extended or adjusted under 35 U.S.C. 154(b) by 209 days.

(21) Appl. No.: 18/118,384

(22) Filed: Mar. 7, 2023

(65) Prior Publication Data
US 2023/0205500 A1 Jun. 29, 2023

(51) Int. Cl.
*G06F 8/41* (2018.01)

(52) U.S. Cl.
CPC ................... *G06F 8/443* (2013.01)

(58) Field of Classification Search
None
See application file for complete search history.

(56) References Cited

U.S. PATENT DOCUMENTS

| | | | |
|---|---|---|---|
| 11,835,989 B1* | 12/2023 | Shum | G06F 9/5072 |
| 2010/0293535 A1* | 11/2010 | Andrade | G06F 8/433 |
| | | | 717/156 |
| 2018/0121120 A1* | 5/2018 | Niu | G06F 3/0604 |
| 2018/0121130 A1* | 5/2018 | Li | G11C 11/4091 |
| 2020/0311200 A1* | 10/2020 | Dubeyko | G06N 3/063 |
| 2021/0097108 A1* | 4/2021 | Goyal | G06F 9/323 |
| 2024/0129219 A1* | 4/2024 | Stan | H04L 43/50 |

FOREIGN PATENT DOCUMENTS

CN 111104120 A * 5/2020 ............ G06F 8/37

OTHER PUBLICATIONS

Tessier et al., "Reconfigurable Computing Architectures," IEEE, 2015, 23pg. (Year: 2015).*

* cited by examiner

*Primary Examiner* — Ryan D. Coyer
(74) *Attorney, Agent, or Firm* — BakerHostetler

(57) ABSTRACT

The present disclosure describes techniques for computation architecture synthesis. Objects may be detected based on source code by a compiler. A type of each object may be identified by the compiler. A plurality of streams each of which corresponds to a particular type of objects among a plurality of types of objects may be defined. A set of operations to be applied to the particular type of objects may be detected. A computational core may be synthesized based on the set of operations. A computational architecture may be synthesized based on the plurality of streams and a plurality of computational cores each of which is associated with at least one of the plurality of streams.

20 Claims, 16 Drawing Sheets

1200

```
┌─────────────────────────────────────────────────────────────────────────┐
│     Detect objects based on source code and identifying a type of each object by │
│                               a compiler 1202                            │
└─────────────────────────────────────────────────────────────────────────┘
                                      │
                                      ▼
┌─────────────────────────────────────────────────────────────────────────┐
│  Synthesize a computational architecture based on a plurality of streams and a │
│  plurality of computational cores each of which is associated with at least one of the │
│                         plurality of streams 1204                       │
└─────────────────────────────────────────────────────────────────────────┘
                                      │
                                      ▼
┌─────────────────────────────────────────────────────────────────────────┐
│    Create the plurality of streams in a memory, each of the plurality of streams │
│        configured to contain a corresponding particular type of objects 1206 │
└─────────────────────────────────────────────────────────────────────────┘
                                      │
                                      ▼
┌─────────────────────────────────────────────────────────────────────────┐
│   Create the plurality of computational cores in a field-programmable gate array │
│                               (FPGA) 1208                                │
└─────────────────────────────────────────────────────────────────────────┘
```

Execute an application based on a computational architecture, wherein the computational architecture comprises a plurality of streams, a plurality of computational cores, and at least one management core configured to orchestrate an activity of associating the plurality of computational cores with the plurality of streams 1402

Store at least one object of a particular type in a corresponding stream in response to an initiation by a thread of the application, wherein objects in any of the plurality of streams are accessible based on memory addresses 1404

Execute an application based on a computational architecture, wherein the computational architecture comprises a plurality of streams, a plurality of computational cores, and at least one management core configured to orchestrate an activity of associating the plurality of computational cores with the plurality of streams 1502

Identify at least one type of objects in response to an initiation of applying an algorithm from a thread of the application 1504

Determine at least one computational core associated with the at least one type of objects by the at least one management core based on memory addresses of the at least one type of objects 1506

Send instructions of the algorithm to the at least one computational core for execution 1508

FIG. 15

COMPUTATION ARCHITECTURE SYNTHESIS

BACKGROUND

Companies and/or individuals are increasingly utilizing and/or producing a large quantity of data. Such data may need to be collected, stored, and translated into usable information (e.g., processed). Improved techniques for data processing are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 12 shows an example process for computation architecture synthesis in accordance with the present disclosure.

FIG. 14 shows an example process for executing an application based on a computation architecture in accordance with the present disclosure.

FIG. 15 shows an example process for executing an application based on a computation architecture in accordance with the present disclosure.

DETAILED DESCRIPTION OF ILLUSTRATIVE EMBODIMENTS

The Central Processing Unit (CPU)-based model of calculation may be one of the obstacles to enhancing performance of data processing (e.g., calculations). The CPU-based model of calculation requires moving data and/or code from persistent memory into dynamic random-access memory (DRAM), and from DRAM into one or more CPU cache(s). Calculation may be executed by means of sharing one or more CPU core(s) amongst multiple threads of execution. However, this computation paradigm introduces a significant number of drawbacks that prevent improved computation performance. For example, this computation paradigm may cause problems with cache coherence, memory wall, and data movement.

Figure 1:
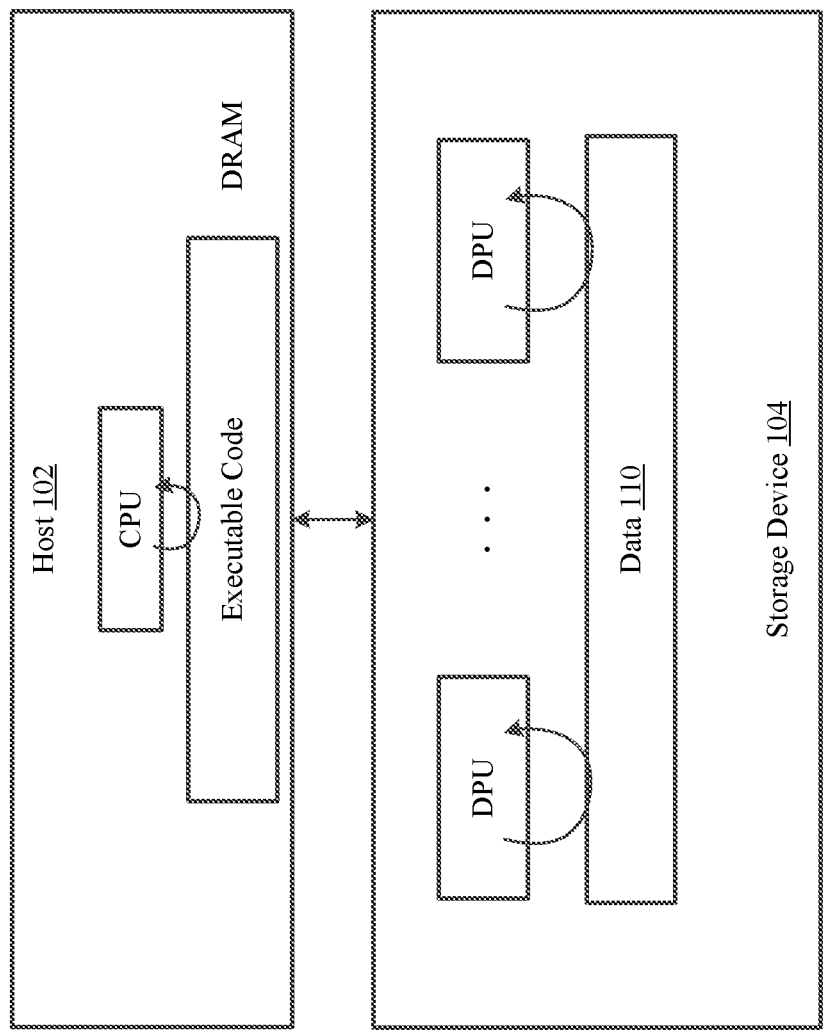
FIG. 1 shows an example framework for computation in accordance with the present disclosure.

To address the drawbacks introduced by the CPU-based model of calculation, computation may be offloaded into data storage space. If computation is offloaded into the data storage space, computational storage or memory may process data in the storage space, thereby bypassing CPU cores. FIG. 1 is an example framework 100 for offloading data processing in accordance with the present disclosure. The framework 100 may comprise a host 102 and a storage device 104. The host 102 may comprise one or more CPUs (e.g., CPU cores). The CPU(s) may be configured to execute an application (e.g., applying algorithms or executable code to data). The host 102 may comprise a DRAM. The storage device 104 may comprise a plurality of data processing units (DPUs). The data 110 may be processed in the storage device 104, such as by the DPUs.

The CPU(s) and the plurality of DPUs may represent different platforms (for example, x86 and ARM, respectively). Thus, the DPUs may be unable to execute code that is built for the CPU's platform. It may be possible to compile code for the DPU platform and/or to use a just-in-time (JIT) compiler approach. It may also be possible to implement the logic of data processing by means of field-programmable gate array (FPGA) based cores. The CPU(s) may need to start, manage, and/or orchestrate the activity of the DPUs in the storage device 104.

Figure 2:
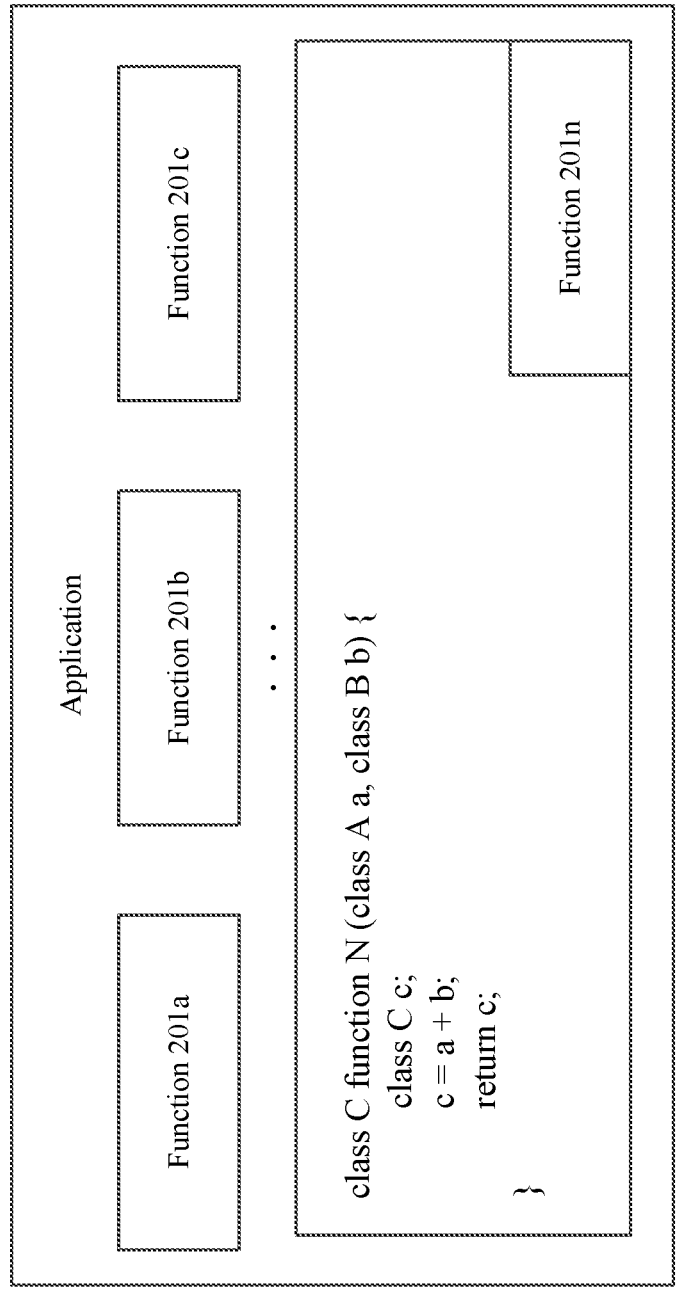
FIG. 2 shows an example application in accordance with the present disclosure.

Functions and objects are fundamental items in the modern computing paradigm. FIG. 2 is an example application 200. The application 202 may comprise a plurality of functions 201a-n that help to manage complexity of the application's code. Each of the plurality of functions 201a-n may execute one particular data modification or algorithm. Thus, the entire workflow of the application may be the sequential or/and parallel execution of the plurality of functions 201a-n. Each of the plurality of functions 201a-n may implement an algorithm that operates with a set of objects. An object may be represented by simple data type (for example, an integer data type) or a complex structure comprising multiple elementary data types as fields. Each of the plurality of functions 201a-n may allocate memory (locally on the stack or dynamically on the heap) to keep object instances during algorithm execution (local variables). Each of the plurality of functions 201a-n may receive input objects that define how the algorithm may be executed. Each of the plurality of functions 201a-n may return the result of execution.

Figure 3:
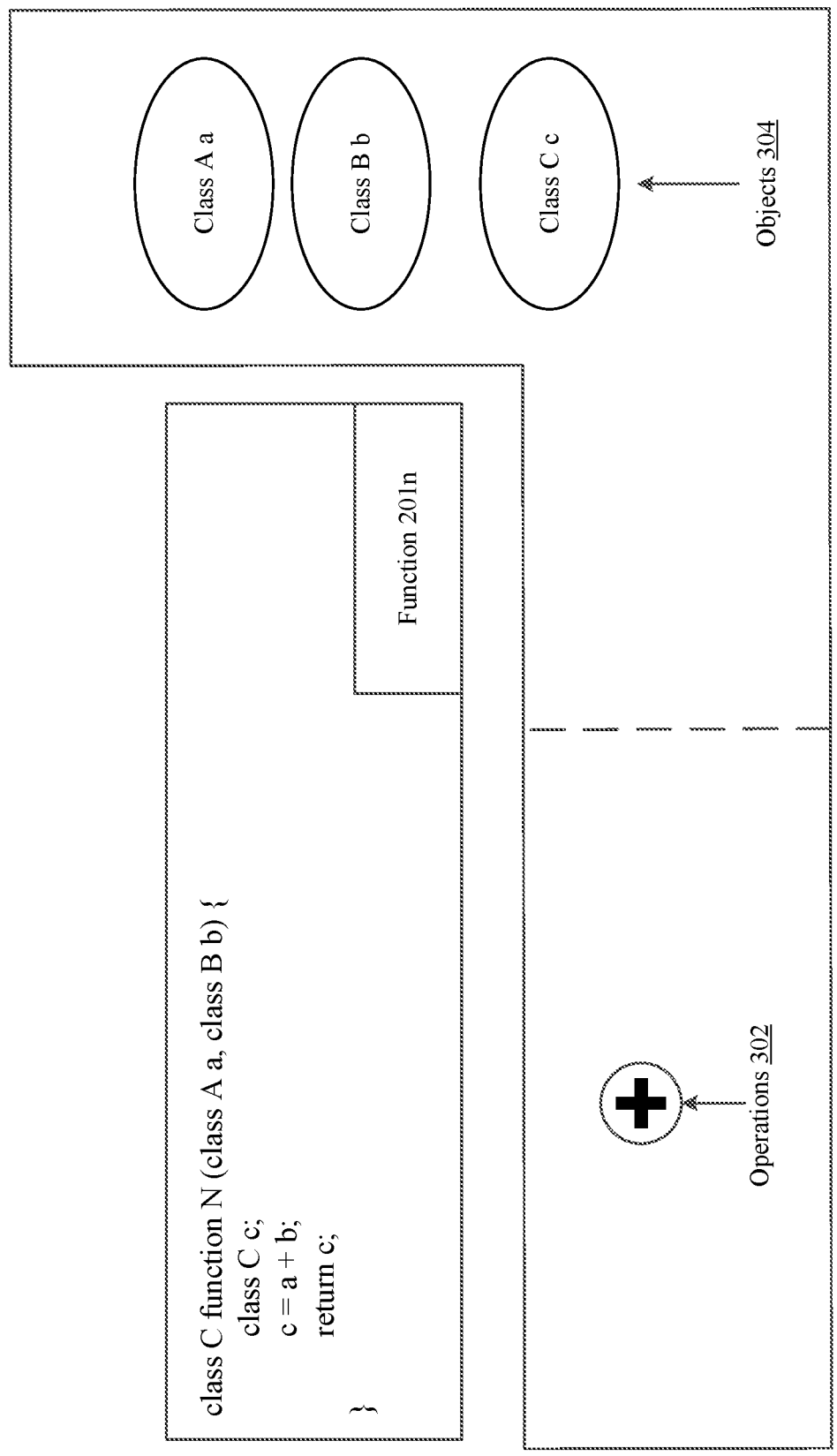
FIG. 3 shows an example framework for a function in accordance with the present disclosure.

A function, such as any of the plurality of functions 201a-n, may comprise an aggregation of some number of objects and operations. FIG. 3 shows an example framework 300 for a function. The function may comprise a set of objects 304 and a set of operations 302. The set of objects 304 may comprise objects of different types. For example, the set of objects 304 may comprise one or more objects of the type Class A (a), one or more objects of the type Class B (b), and one or more objects of the type Class C (c). The function may be configured to implement an algorithm by means of applying the operations on the objects. Any object instance may require allocated memory. The allocated memory may keep the current state of the object. The allocated memory may be accessed to execute operation(s) on the object. An operation may need to be implemented as functional unit of arithmetic-logic unit (ALU), for example.

Figure 4:
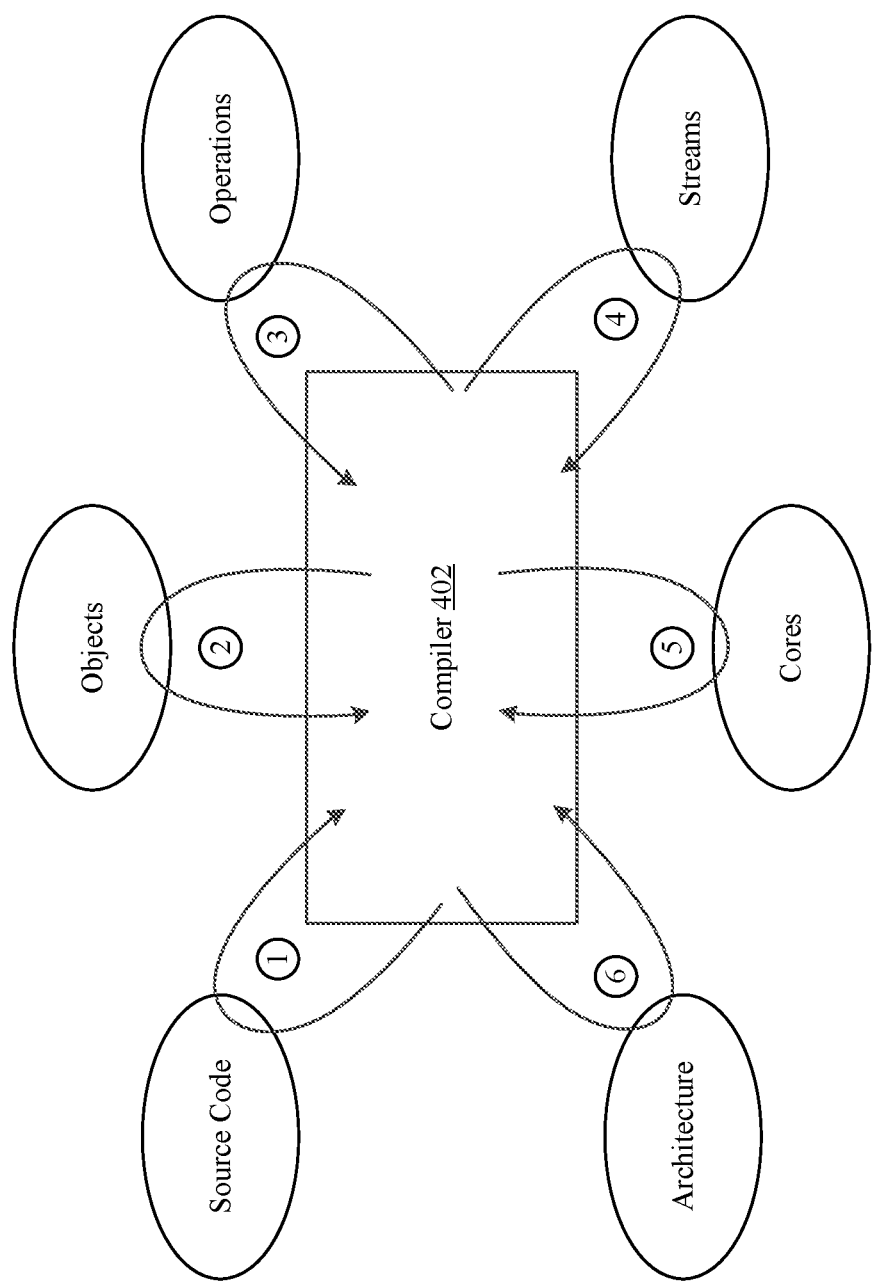
FIG. 4 shows an example framework for computation architecture synthesis in accordance with the present disclosure.

A compiler may be configured to define a computational architecture associated with executing an application. FIG. 4 is an example framework 400 for computation architecture synthesis in accordance with the present disclosure. To define the computational architecture, at numeral 1, a compiler may be configured to receive source code. The compiler 402 may be configured to analyze the source code. For example, the compiler may analyze the source code to detect (e.g., determine) objects associated with the source code. At numeral 2, the compiler 402 may detect objects associated with the source code. The compiler 402 may identify a type of each object.

At numeral 3, the compiler 402 may detect a set of elementary operations (e.g., primitive operations) that need to be applied for every particular object or data type. At numeral 4, the compiler 402 may define a plurality of streams. Each of the plurality of streams may correspond to a particular type of object among a plurality of types of objects. For example, each of the plurality of streams may be configured to store a plurality of objects of the same type. Streams are discussed in more detail below with regard to FIGS. 5-6.

At numeral 5, the compiler 402 may synthesize a plurality of computational cores. Each of the computational cores may comprise a synthesis or aggregation of a set of elementary operations detected by the compiler 402 based on the compiler 402 analyzing the source code. The plurality of computational cores each may be synthesized based on a set of operations. The plurality of computational cores each may be synthesized as a set of logical or arithmetic operations that need to be applied for a particular data type. Each of the plurality of computational cores may be associated with at least one of the plurality of streams. Each stream of the plurality of streams may be associated with one or more computational cores. The synthesis of computational cores is discussed in more detail below with regard to FIG. 7. At numeral 6, the compiler 402 may synthesize a computational architecture. The computational architecture may be synthesized based on the plurality of streams and the plurality of computational cores. The computational architecture may need to be synthesized only one time. Then, code may be executed multiple times based on the synthesized computational architecture, thereby significantly enhance data processing performance. The computational architecture may further comprise at least one management core. The at least one management core may be configured to orchestrate activity of the plurality of computational cores. For example, the at least one management core may define which computational core(s) execute operations on the objects stored in each of the plurality of streams.

As described above, an application may operate based on various types of objects. Each object may be characterized by a granularity and a structure. However, an application may frequently operate based on arrays or sets of objects. A stream may be used as a container to store multiple objects of the same type. Thus, a compiler may utilize streams for allocating memory and keeping the same type of objects as a sequence or array. Representing the same type of objects as an array allows for the same algorithm to be applied to multiple objects of the same type sequentially or in parallel.

Figure 5:
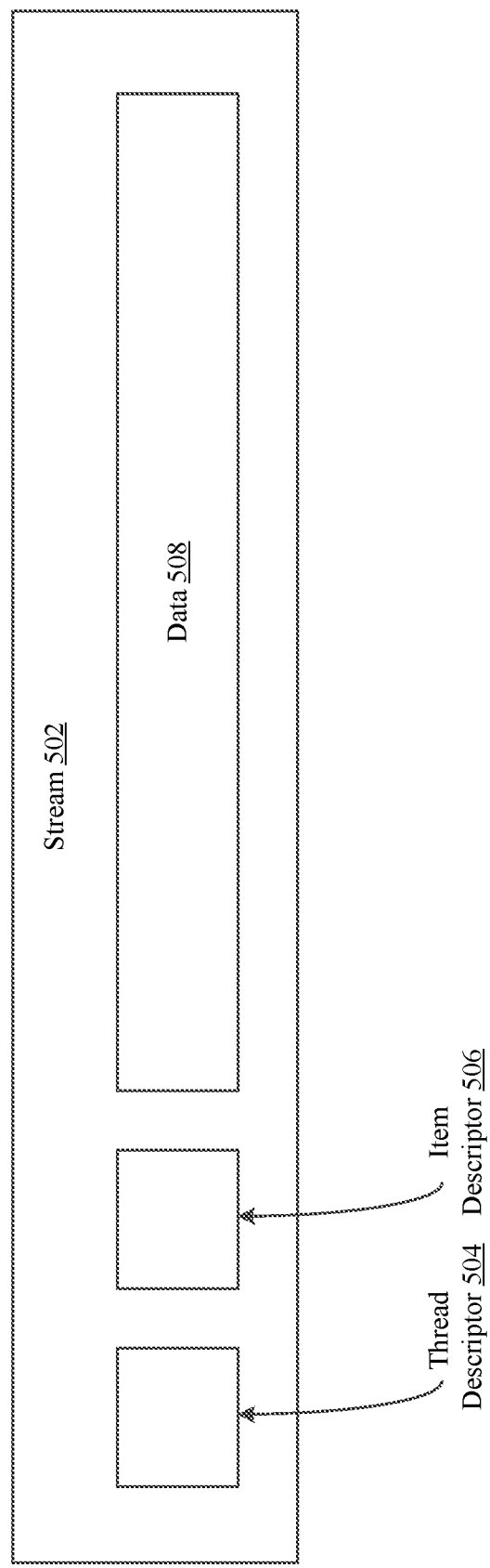
FIG. 5 shows an example stream in accordance with the present disclosure.

FIG. 5 is an example stream 502. The stream 502 may comprise a thread descriptor 504, an item descriptor 506, and data 508. The data 508 may comprise a sequence of objects of the same data type. The sequence of objects may comprise multiple objects of the same type. The thread descriptor 504 may describe one or more algorithms. For example, the thread descriptor 504 may be indicative of algorithm logic to be applied to the data 508 (e.g., the sequence of objects) associated with the stream 502. An application may use this logic to offload data processing into the storage device side. The item descriptor 506 may comprise metadata that defines the size or granularity of one object instance. The item descriptor 506 may comprise metadata describing the type, granularity, and sequence of object's fields. The item descriptor 506 may describe the stream at whole (e.g., a number of items in the stream, an available capacity of the stream, etc.)

Figure 6:
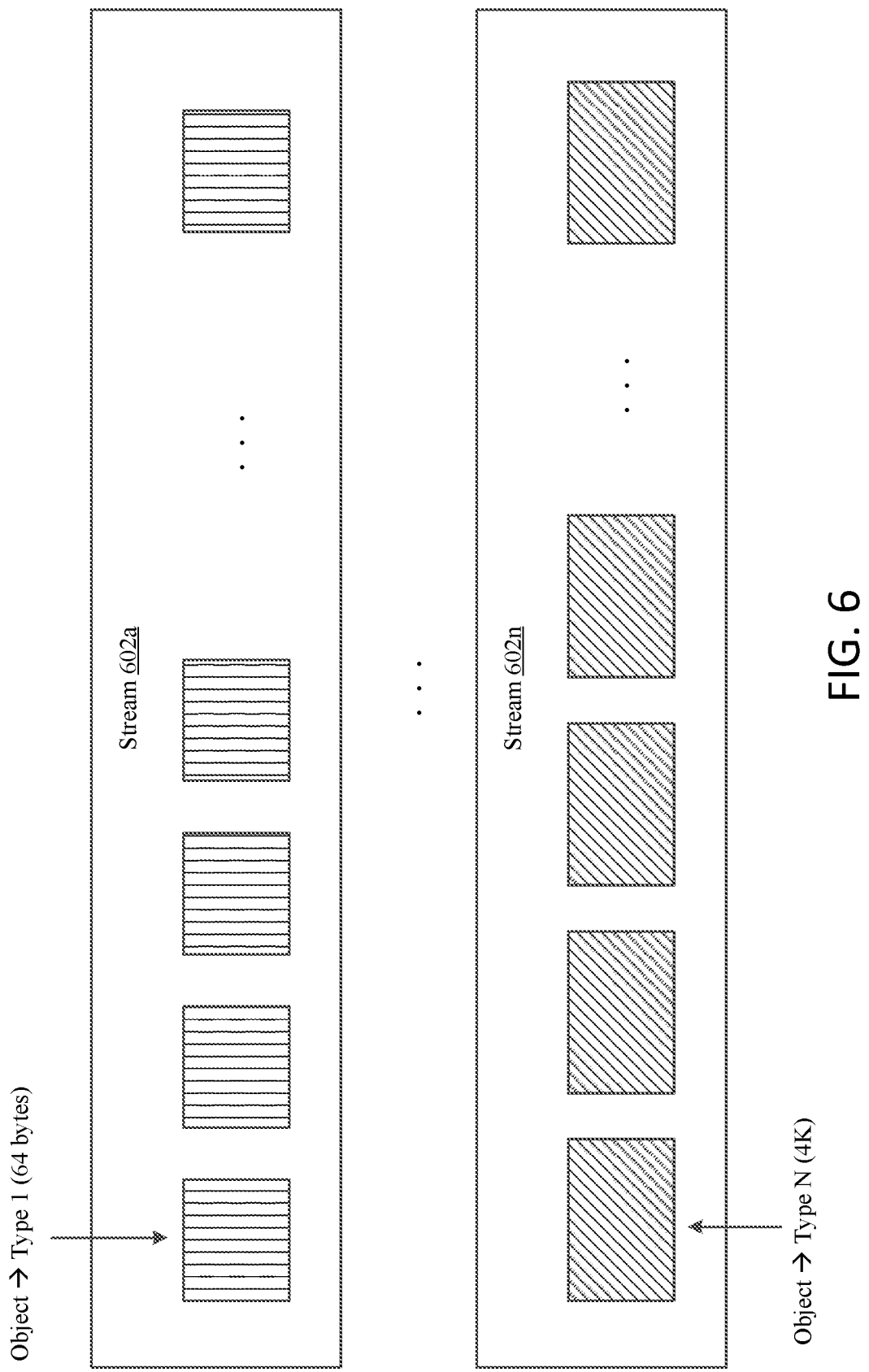
FIG. 6 shows example streams in accordance with the present disclosure.

FIG. 6 is example objects of a same type in each of a plurality of streams 602a-n. The plurality of streams 602a-n may comprise any quantity of streams. Each of the plurality of streams 602a-n may comprise a same type of data. The data may comprise a sequence of objects of the same type. The sequence of objects may comprise multiple objects of the same type. For example, the stream 602a may store multiple objects of a first type. Each of the objects of the first type may be a 64-byte object. Another stream may store multiple objects of a second type, and so on. The stream 602n may store multiple objects of type N. Each of the objects of type N may be a 4 KB object.

Figure 7:
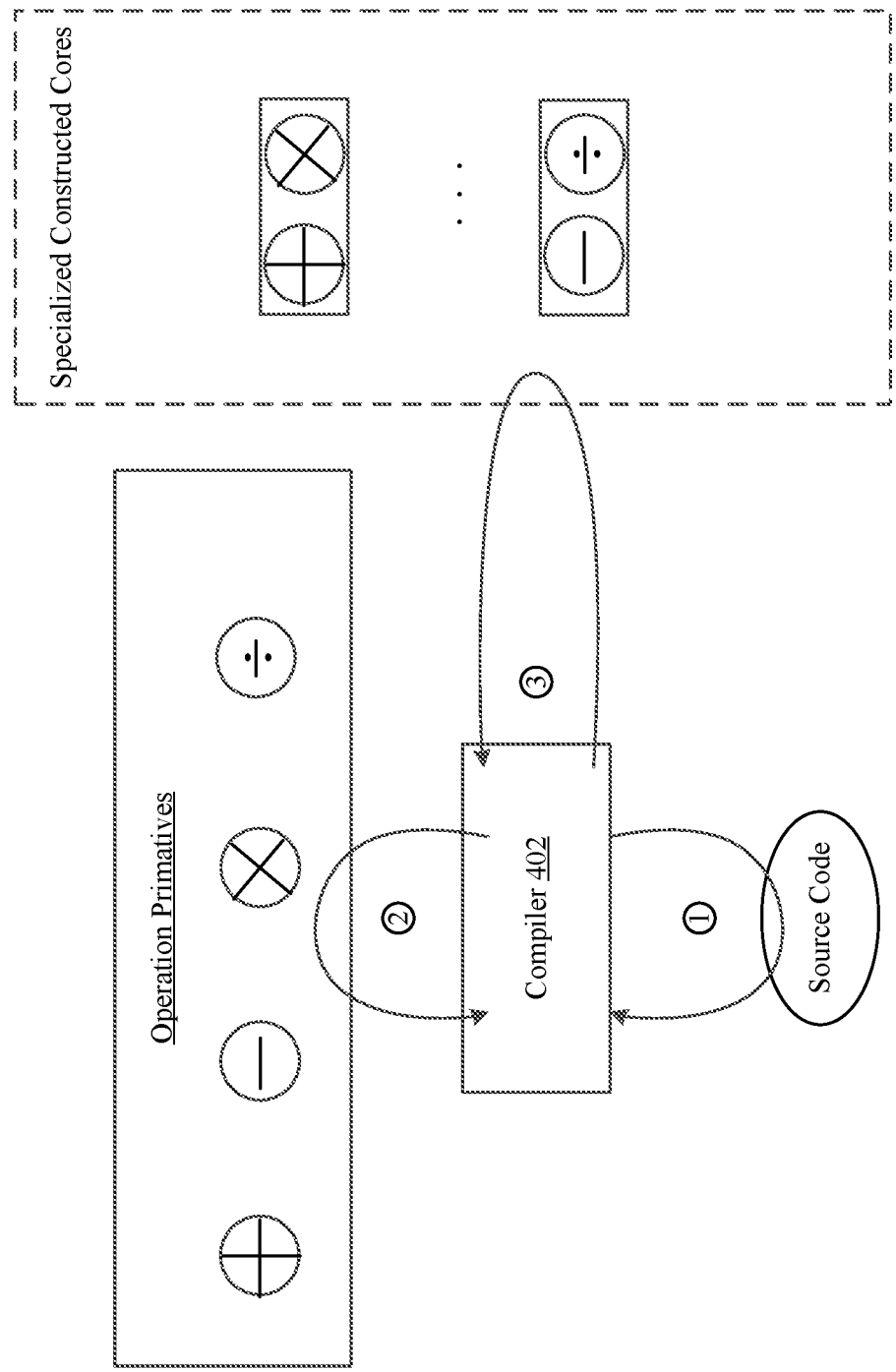
FIG. 7 shows an example framework for computation core synthesis in accordance with the present disclosure.

As described above with regard to FIG. 4, the compiler 402 may synthesize a plurality of computational cores. FIG. 7 shows an example framework 700 for computational core synthesis. An application may define data types and methods for processing of instances of these data types. At numeral 1, the compiler 402 may receive source code indicative of these data types and the methods for processing instances of these data types. Each of these methods may define an algorithm that requires a set of elementary arithmetical or logical operations. The set of elementary operations may not include all of elementary operations that a complex CPU core can provide. Thus, every computational core may be synthesized on the basis of a small subset of all available elementary operations. At numeral 2, the compiler 402 may define, for each data type, a subset of elementary operations (i.e., operation primitives) that the data type requires. To define, for each data type, the subset of elementary operations that the data type requires, the compiler 402 may utilize a pool of elementary operation patterns. The pool of elementary operation patterns may include all of the elementary operations that a complex CPU core can provide.

At numeral 3, the compiler 402 may synthesize specialized computational cores based on corresponding subsets of elementary operations. Thus, the compiler 402 may define multiple small, simple, specialized computational cores by synthesizing elementary operation primitives. Such specialized cores can be used to process data of particular data type in the data stream(s). Each of the plurality of computational cores may be associated with at least one of the plurality of streams. Each stream of the plurality of streams may be associated with one or more computational cores. If a stream is associated with a plurality of computational cores, each of the plurality of computational cores may be synthesized based on the same set of operations. Alternatively, if a stream is associated with a plurality of computational cores, at least a subset of the plurality of computational cores may be synthesized based on different sets of operations. If at least a subset of the plurality of computational cores is synthesized based on different sets of operations, the subset of the plurality of computational cores may be configured to implement different algorithm logics on the same stream.

Figure 8:
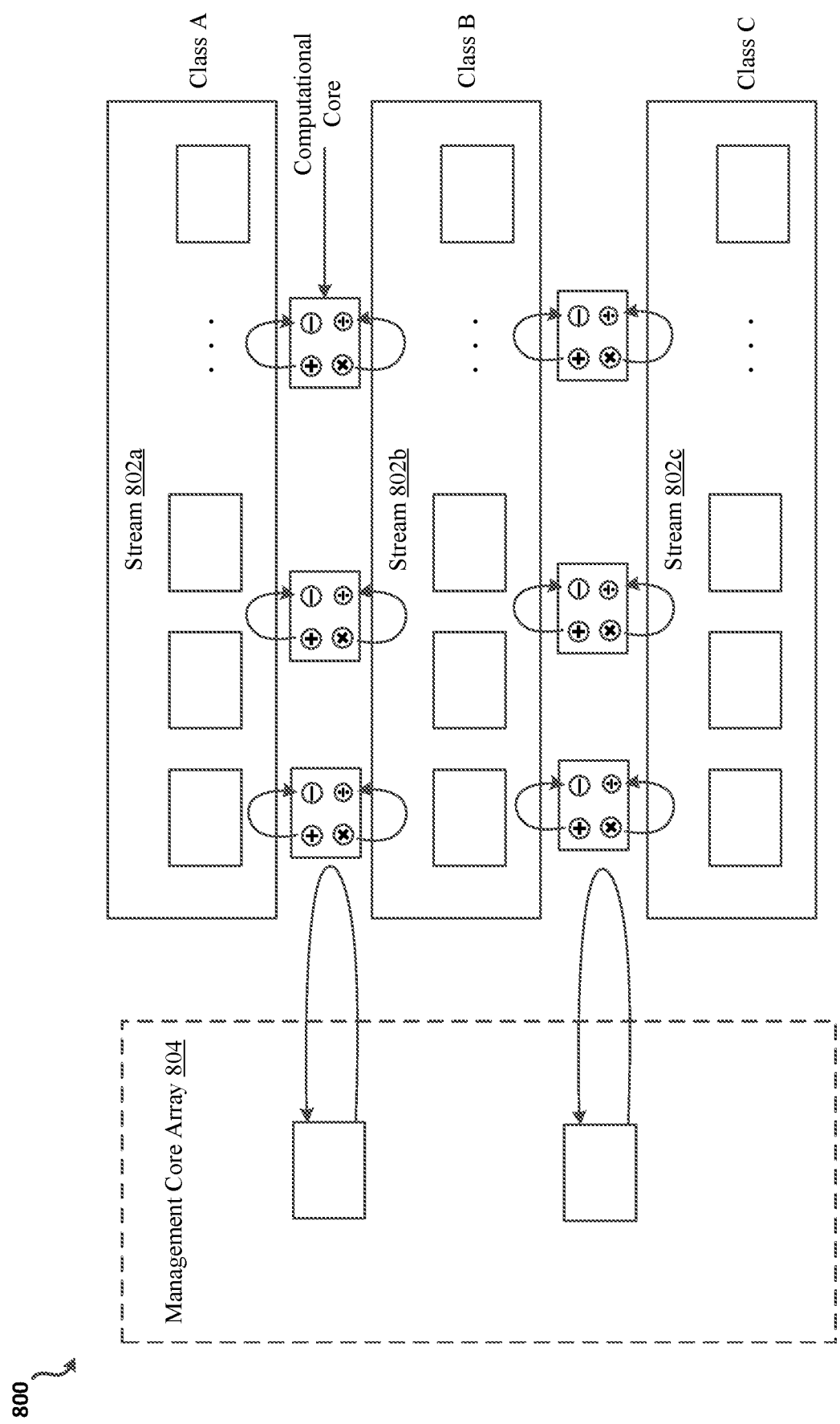
FIG. 8 shows an example computation architecture in accordance with the present disclosure.

FIG. 8 shows an example synthesized computation architecture 800 in accordance with the present disclosure. The architecture 800 may comprise a plurality of streams 802a-c. The compiler (e.g., compiler 402) may identify all data types or object types in an application. The plurality of streams 802a-c may be created based on the identified data types of object types. The plurality of streams 802a-c may be created in memory (e.g., persistent memory or volatile memory) to store objects of different types. As described above, each of the plurality of streams 802a-c may comprise a thread descriptor, an item descriptor, and data. The data may comprise a sequence of objects of the same data type. The sequence of objects may comprise multiple objects of the same type. For example, the stream 802a may store multiple objects of a first type, the stream 802b may store multiple objects of a second type, and the stream 802c may store multiple objects of a third type.

Each object associated with the application may be associated with at least one algorithm. Each algorithm may be associated with a set of elementary logical or arithmetical operations. Thus, a set of elementary operations that needs to be applied for each object or data type may be determined. The set of elementary operations that needs to be applied for each object or data type may be used to synthesize a plurality of computational cores. The synthesized computational cores may be configured to execute logical or arithmetical operations with particular object instances in the plurality of streams 802a-c.

One or more of the synthesized computational cores may be associated with each of the plurality of streams 802a-c. As described above, if a stream is associated with a plurality of computational cores, each of the plurality of computational cores may be synthesized based on the same set of operations. Alternatively, if a stream is associated with a plurality of computational cores, at least a subset of the plurality of computational cores may be synthesized based on different sets of operations. If at least a subset of the plurality of computational cores is synthesized based on different sets of operations, the subset of the plurality of computational cores may be configured to implement different algorithm logics on the same stream. A single synthesized computational core may be associated with (e.g., shared by) two or more of the plurality of streams 802a-c.

In embodiments, the architecture 800 comprises a management core array 804. The management core array 804 may comprise one or more management cores. The one or more management cores may be configured to orchestrate activity of the plurality of computational cores. For example, at least one management core may define which computational core(s) execute operations on the objects stored in each of the plurality of streams 802a-c.

Figure 9:
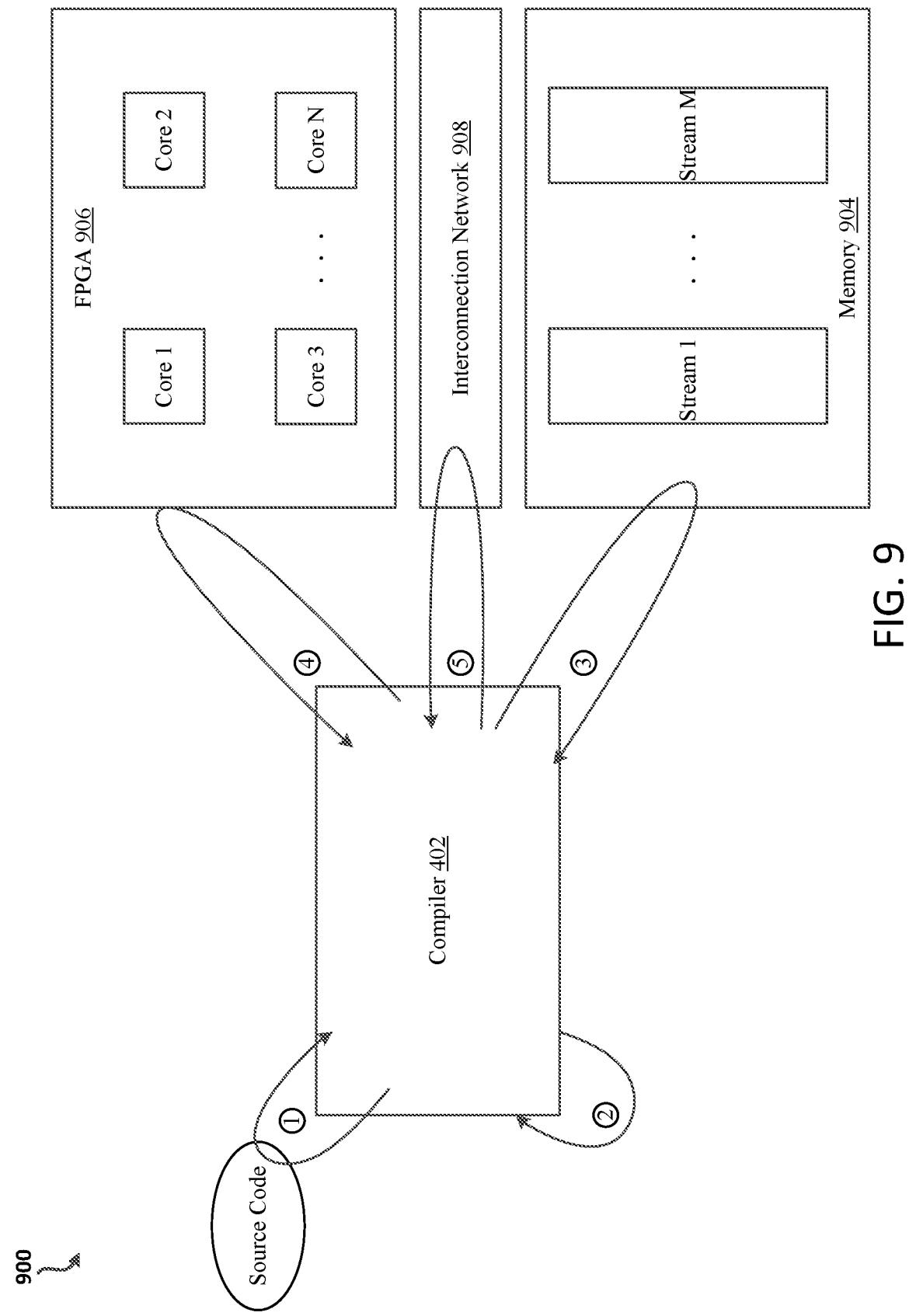
FIG. 9 shows an example computation architecture in accordance with the present disclosure.

FIG. 9 shows an example workflow 900 of synthesizing and implementing a computation architecture. At numeral 1, as described above, the compiler 402 may be configured to receive source code. The compiler 402 may be configured to analyze the source code to detect (e.g., determine) objects associated with the source code. The compiler 402 may identify a type of each object. The compiler 402 may detect a set of elementary operation that needs to be applied for every particular object or data type. The compiler 402 may define a plurality of streams. Each of the plurality of streams may correspond to a particular type of object among a plurality of types of objects. The compiler 402 may synthesize a plurality of computational cores. The plurality of computational cores each may be synthesized based on a set of operations detected by the compiler 402. The plurality of computational cores may be synthesized as a set of logical or arithmetic operations that need to be applied for a particular data type. At numeral 2, the compiler 402 may synthesize a computational architecture. The computational architecture may be synthesized based on the plurality of streams and the plurality of computational cores. The computational architecture may further comprise at least one management core.

At numeral 3, the plurality of streams defined by the compiler may be created in a memory 904. The memory, for example, may be a persistent memory (e.g., MRAM, ReRAM, NAND flash, etc.). Alternatively, the memory may be a volatile memory (e.g., DRAM). At numeral 4, the synthesized computational cores may be created. For instance, the computational cores may be created in a field-programmable gate array (FPGA) 906. The computational cores in the FPGA 906 may be connected to the plurality of streams in the memory 904. For example, the computational cores in the FPGA 906 may be connected to the plurality of streams in the memory 904 via an interconnection network 908.

Figure 10:
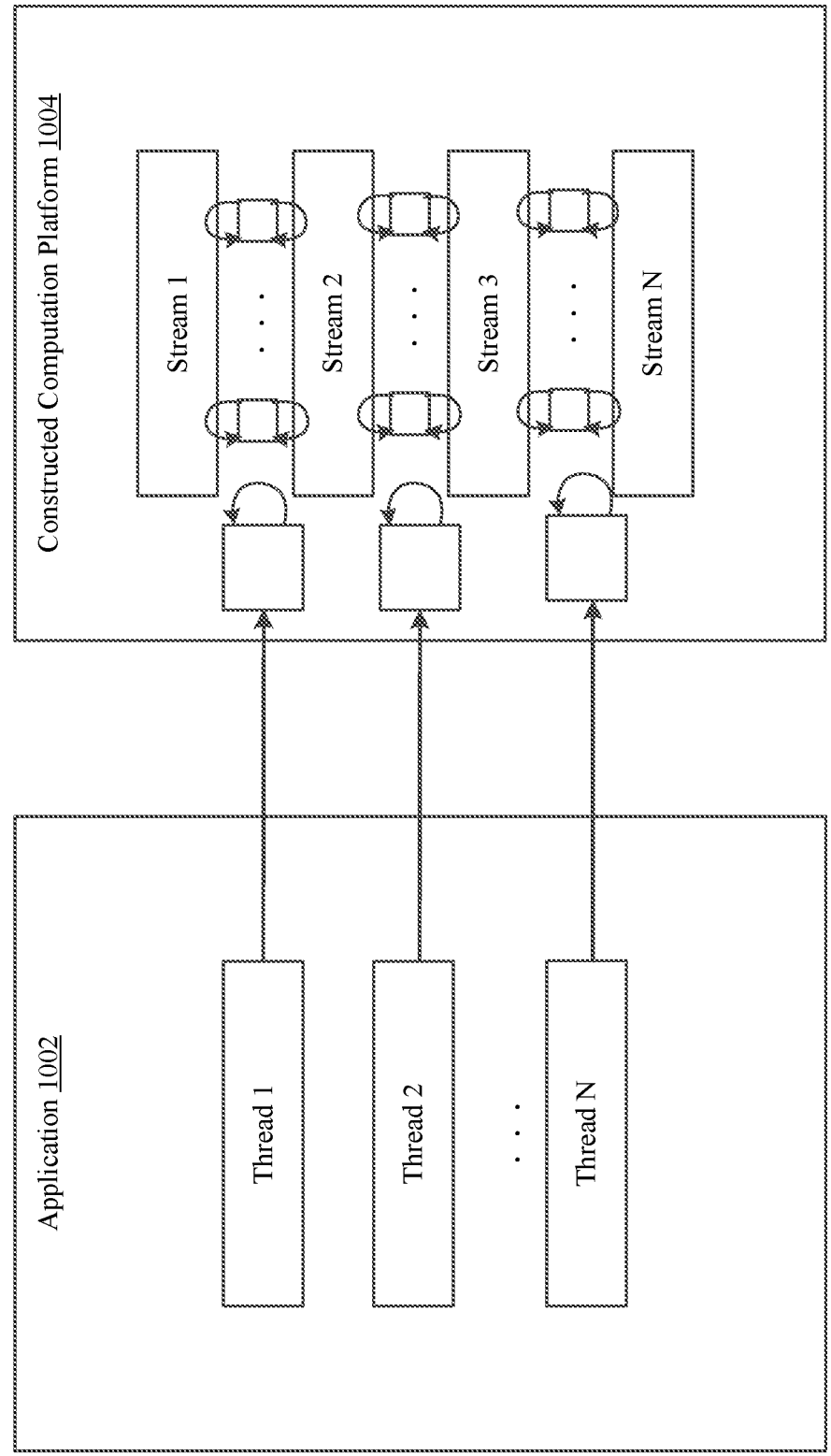
FIG. 10 shows an example framework for application execution in accordance with the present disclosure.

FIG. 10 shows an example framework 1000 for application execution in accordance with the present disclosure. The framework 1000 may comprise an application 1002 and a computational platform 1004. The computational platform 1004 may comprise the computational architecture described above with regard to FIGS. 8, and 9. For example, the computational platform 1004 may comprise a plurality of streams (e.g., Stream 1-Stream N) and a plurality of computational cores. Each of the plurality of streams may be associated with one or more computational cores. A single computational core may be associated with one or more streams.

The application 1002 may start a set of threads (e.g., Thread 1-Thread N). Each thread may operate based on objects of a particular type of data. The responsibility of each thread may be to apply algorithm(s) on the corresponding objects. If a thread would like to store and/or generate an object of particular data type, then a stream among the plurality of streams corresponding to that particular data type may receive and/or store this object. For example, the thread may cause to store the object in a stream corresponding to the particular data type. The objects in the stream may be accessed based on memory addresses.

A thread logic may be represented by certain function. A function (e.g., thread logic) may comprise a sequence of machine instructions. Thus, a thread may comprise a sequence of machine instructions. The sequence of machine instructions may be stored as a file initially in a persistent memory (e.g., in a solid-state drive (SSD) and/or a hard disk drive (HDD)). Starting a thread may comprise copying the sequence of machine instructions from the persistent memory into DRAM and, finally, into an instruction cache that may be part of a constructed computational platform. The sequence of machine instructions may be stored in a persistent memory of the constructed computational platform (e.g., NOR flash). If the sequence of machine instructions is stored into the persistent memory of the constructed computational platform, then the machine instructions may be executed directly in the persistent memory of the constructed computational platform, such as by using an XiP (eXecute-In-Place) approach.

Management core(s) may define which particular computational core(s) execute the algorithm instructions. The management core may be configured to identify the data type based on a memory pointer or based on the instructions. The management core may send the instructions to a particular computational core associated with data stream of this data type. Each computational core may be associated with a memory addresses range. The management core may send the instructions to the particular computational core associated with data streams of this data type and associated with a memory range that is close to the data object's memory address. The data object's memory address may be used to directly identify the computational core(s) that are capable of operating with the particular data object.

The techniques described herein provide a flexible way to synthesize and implement a specialized computational architecture. The specialized computational architecture may be highly optimized for particular data types and particular application types. Such deep specialization may significantly enhance data processing performance and decrease the latency of computation operations. The techniques described herein provide a flexible way to create a highly parallel architecture. Data processing may be distributed amongst multiple cores with a specialized architecture for particular data types. This approach may create highly optimized and specialized cores that are configured to create specialized hardware accelerators. The techniques described herein do not require the writing of any specialized source code. The compiler is responsible for analyzing source code and defining the specialized, highly optimized architecture. FPGA may provide an easy and highly flexible way to rebuild the computational architecture on the fly.

Figure 11:
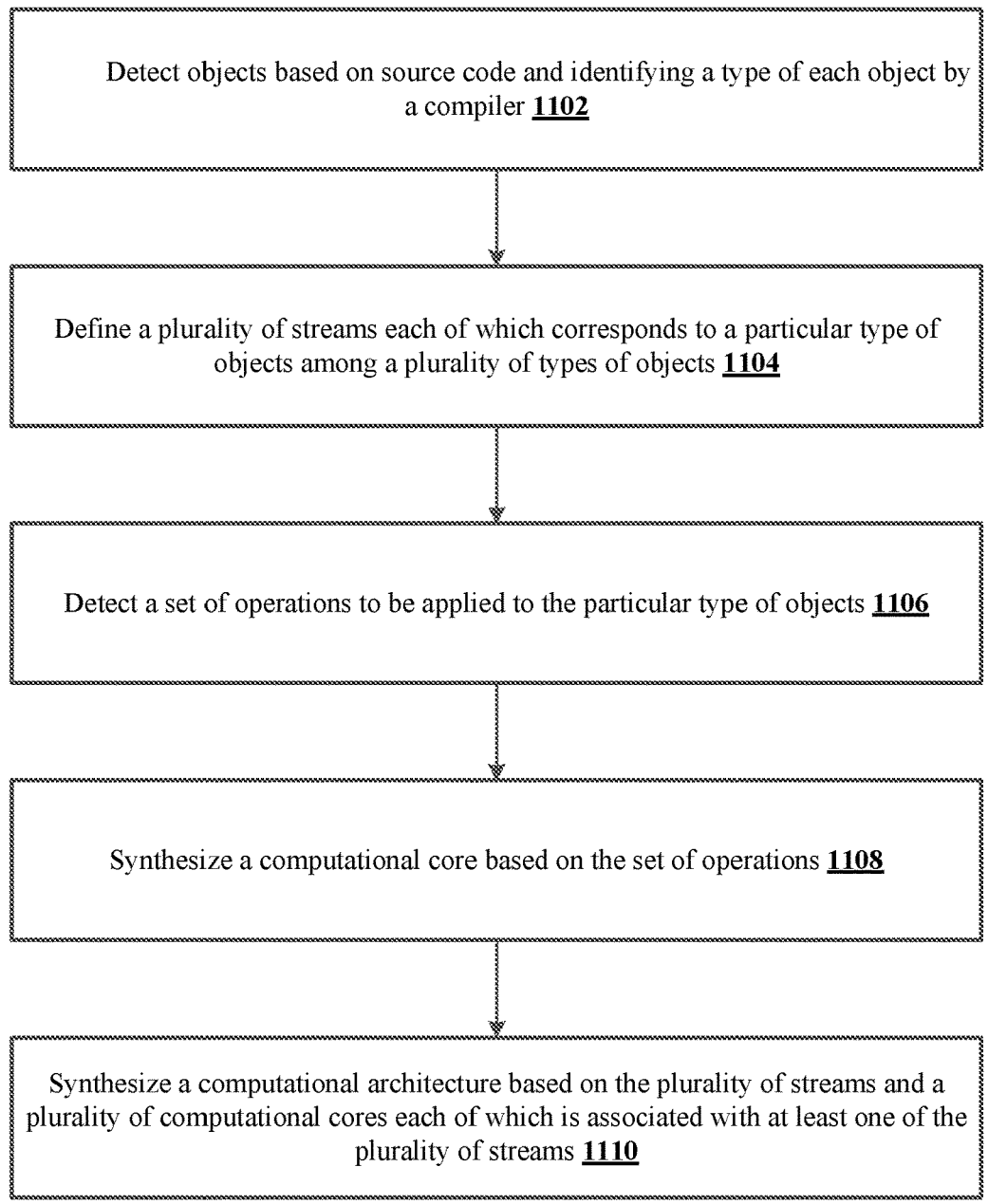
FIG. 11 shows an example process for computation architecture synthesis in accordance with the present disclosure.

FIG. 11 illustrates an example process 1100. The process 1100 may be performed for computation architecture synthesis. Although depicted as a sequence of operations in FIG. 11, those of ordinary skill in the art will appreciate that various embodiments may add, remove, reorder, or modify the depicted operations.

To define a computational architecture, a compiler may be configured to receive source code. The source code may be analyzed. For example, the source code may be analyzed to detect (e.g., determine) objects associated with the source code. At 1102, objects may be detected. The objects may be detected based on source code. A type of each object may be identified. The objects may be detected by a compiler. The type of each object may be determined by the compiler. At 1104, a plurality of streams may be defined. Each of the plurality of streams may correspond to a particular type of objects among a plurality of types of objects. For example, each of the plurality of streams may be configured to store a plurality of objects of the same type.

A set of elementary operation that needs to be applied for every particular object or data type may be detected by the compiler. At 1106, a set of operations may be detected. The set of operations may comprise a set of operations to be applied to the particular type of objects. At 1108, a computational core may be synthesized. The computational core may be synthesized based on the set of operations. The plurality of computational cores may be synthesized as a set of logical or arithmetic operations that need to be applied for a particular data type. Each of the plurality of computational cores may be associated with at least one of the plurality of streams. Each stream of the plurality of streams may be associated with one or more computational cores. For example, each stream of the plurality of streams may be associated with one or more computational cores configured to execute operations on the objects stored in that stream. At 1110, a computational architecture may be synthesized. The computational architecture may be synthesized based on the plurality of streams and a plurality of computational cores. Each of the plurality of computational cores may be associated with at least one of the plurality of streams. The computational architecture may need to be synthesized only one time. Then, code may be executed multiple times based on the synthesized computational architecture, thereby significantly enhance data processing performance.

FIG. 12 illustrates an example process 1200. The process 1200 may be performed for synthesizing and implementing a computation architecture. Although depicted as a sequence of operations in FIG. 12, those of ordinary skill in the art will appreciate that various embodiments may add, remove, reorder, or modify the depicted operations.

To define a computational architecture, a compiler may be configured to receive source code. The source code may be analyzed. For example, the source code may be analyzed to detect (e.g., determine) objects associated with the source code. At 1202, objects may be detected. The objects may be detected based on source code. A type of each object may be identified. The objects may be detected by a compiler. The type of each object may be identified by the compiler. A set of elementary operation that needs to be applied for every particular object or data type may be detected. A plurality of streams may be defined. Each of the plurality of streams may correspond to a particular type of object among a plurality of types of objects. A plurality of computational cores may be synthesized. The plurality of computational cores may be synthesized based on sets of operations. The plurality of computational cores may be synthesized as a set of logical or arithmetic operations that need to be applied for a particular data type. At 1204, a computational architecture may be synthesized. The computational architecture may be synthesized based on the plurality of streams and a plurality of computational cores. Each of the plurality of computational cores may be associated with at least one of the plurality of streams.

At 1206, the plurality of streams may be created. The plurality of streams may be created in a memory. The memory, for example, may be a persistent memory (e.g., MRAM, ReRAM, NAND flash, etc.). Alternatively, the memory may be a volatile memory (e.g., DRAM). Each of the plurality of streams configured to contain a corresponding particular type of objects. At 1208, the plurality of computational cores may be created. The plurality of computational cores may be created in a field-programmable gate array (FPGA). The computational cores in the FPGA may be connected to the plurality of streams in the memory. For example, the computational cores in the FPGA may be connected to the plurality of streams in the memory 904 via an interconnection network.

Figure 13:
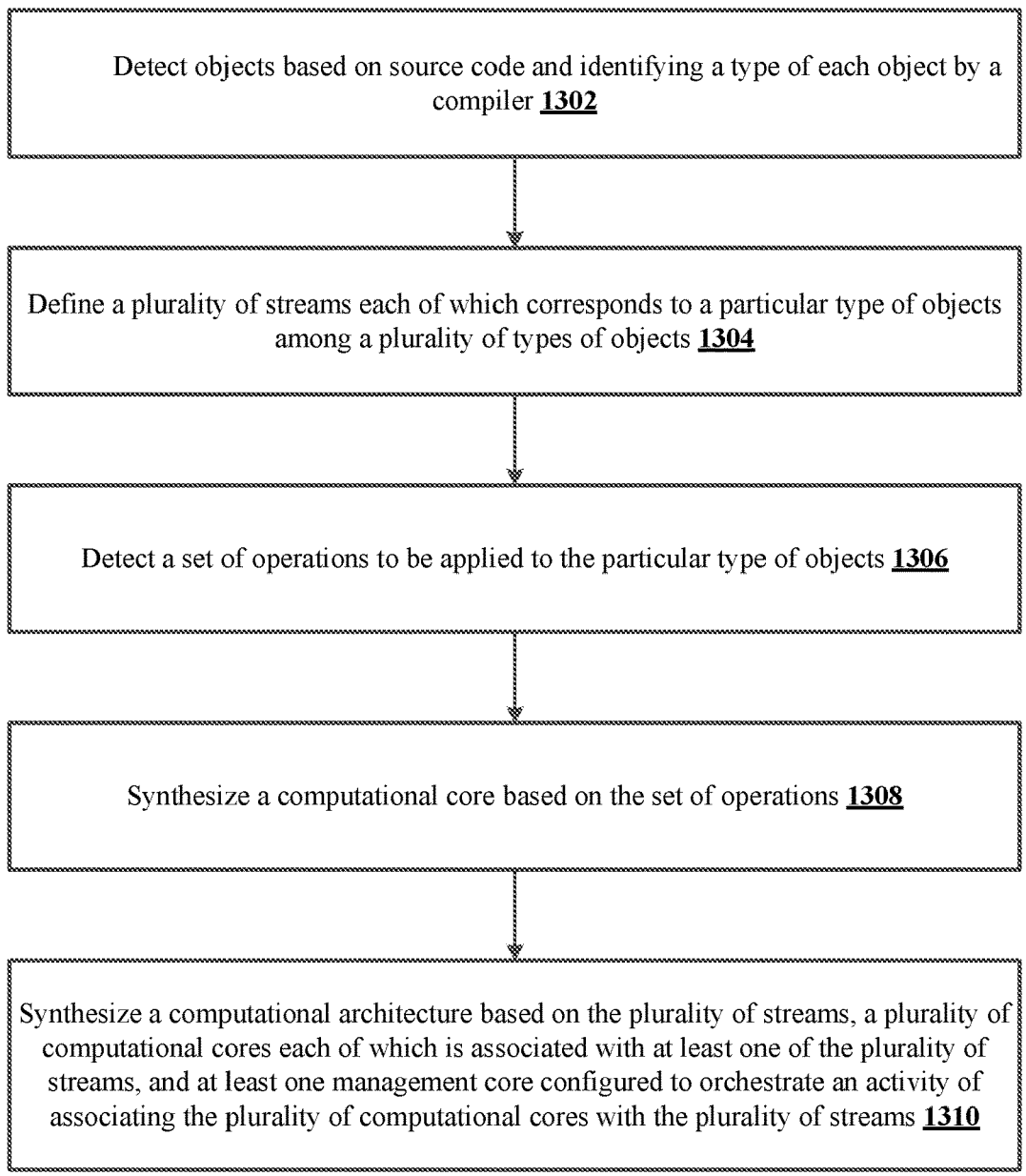
FIG. 13 shows an example process for computation architecture synthesis in accordance with the present disclosure.

FIG. 13 illustrates an example process 1300. The process 1300 may be performed for computation architecture synthesis. Although depicted as a sequence of operations in FIG. 13, those of ordinary skill in the art will appreciate that various embodiments may add, remove, reorder, or modify the depicted operations.

To define a computational architecture, a compiler may be configured to receive source code. The source code may be analyzed. For example, the source code may be analyzed to detect (e.g., determine) objects associated with the source code. At 1302, objects may be detected. The objects may be detected based on source code. A type of each object may be identified. The objects may be detected by a compiler. The type of each object may be determined by the compiler. At 1304, a plurality of streams may be defined. Each of the plurality of streams may correspond to a particular type of objects among a plurality of types of objects. For example, each of the plurality of streams may be configured to store a plurality of objects of the same type.

A set of elementary operation that needs to be applied for every particular object or data type may be detected. At 1306, a set of operations may be detected. The set of operations may comprise a set of operations to be applied to the particular type of objects. At 1308, a computational core may be synthesized. The computational core may be synthesized based on the set of operations. The plurality of computational cores each may be synthesized as a set of logical or arithmetic operations that need to be applied for a particular data type. Each of the plurality of computational cores may be associated with at least one of the plurality of streams. Each stream of the plurality of streams may be associated with one or more computational cores. For example, each stream of the plurality of streams may be associated with one or more computational cores configured to execute operations on the objects stored in that stream. At 1310, a computational architecture may be synthesized. The computational architecture may be synthesized based on the plurality of streams and a plurality of computational cores. Each of the plurality of computational cores may be associated with at least one of the plurality of streams. The computational architecture may further comprise at least one management core. The at least one management core may be configured to orchestrate activity of the plurality of computational cores. For example, the at least one management core may define which computational core(s) execute operations on the objects stored in each of the plurality of streams.

FIG. 14 illustrates an example process 1400. The process 1400 may be performed for executing an application based on a computation architecture. Although depicted as a sequence of operations in FIG. 14, those of ordinary skill in the art will appreciate that various embodiments may add, remove, reorder, or modify the depicted operations.

At 1402, an application may be executed. The application may be executed based on a computational architecture. The computational architecture may comprise a plurality of streams. The computational architecture may comprise a plurality of computational cores. The computational architecture may comprise at least one management core. The at least one management core may be configured to orchestrate an activity of associating the plurality of computational cores with the plurality of streams. For example, the at least one management core may define which computational core(s) execute operations on the objects stored in each of the plurality of streams. Each of the plurality of streams may be associated with one or more computational cores. A single computational core may be associated with one or more streams.

The application may start a set of threads. Each thread may operate based on objects of a particular type of data. The responsibility of each thread may be to apply certain algorithm on the corresponding objects. If a thread would like to store and/or generate an object of particular data type, then a stream among the plurality of streams corresponding to that particular data type may receive and/or store this object. At 1404, at least one object of a particular type may be stored in a corresponding stream. The at least one object of a particular type may be stored in a corresponding stream in response to an initiation by a thread of the application. For example, the thread may cause to store at least one object in a corresponding stream.

The objects in any of the plurality of streams may be accessible based on memory addresses. Each computational core may be associated with a memory addresses range. The management core may send the instructions to the particular computational core associated with data streams of this data type and associated with a memory range that is close to the data object's memory address. Thus, the data object's memory address may be used to directly identify the computational core(s) that are capable of operating with the particular data object.

FIG. 15 illustrates an example process 1500. The process 1500 may be performed for executing an application based on a synthesized computation architecture. Although depicted as a sequence of operations in FIG. 15, those of ordinary skill in the art will appreciate that various embodiments may add, remove, reorder, or modify the depicted operations.

At 1502, an application may be executed. The application may be executed based on a computational architecture. The computational architecture may comprise a plurality of streams. The computational architecture may comprise a plurality of computational cores. The computational architecture may comprise at least one management core. The at least one management core may be configured to orchestrate an activity of associating the plurality of computational cores with the plurality of streams. For example, the at least one management core may define which computational core(s) execute operations on the objects stored in each of the plurality of streams. Each of the plurality of streams may be associated with one or more computational cores. A single computational core may be associated with one or more streams.

The application may start a set of threads. Each thread may operate based on objects of a particular type of data. The responsibility of each thread may be to apply certain algorithm on the corresponding objects. A thread may comprise a sequence of machine instructions. The sequence of machine instructions may be stored as a file initially in a persistent memory (e.g., in a solid-state drive (SSD) and/or a hard disk drive (HDD)). Starting a thread may comprise copying the sequence of machine instructions from the persistent memory into DRAM and, finally, into an instruction cache that may be part of the constructed computational platform. If the sequence of machine instructions is stored into a persistent memory (e.g., NOR flash) of the constructed computational platform, then the machine instructions may be executed directly in the persistent memory of the constructed computational platform, such as by using an XiP (eXecute-In-Place) approach.

Management core(s) may define which particular computational core(s) execute the algorithm instructions. The management core may be configured to identify the data type based on a memory pointer or based on the instructions. The data object's memory address may be used to directly identify the computational core(s) that are capable of operating with the particular data object.

At 1504, at least one type of objects may be identified. The at least one type of objects may be identified in response to an initiation of applying an algorithm from a thread of the application. The management core may be configured to identify the at least one type of objects based on a memory pointer. Alternatively, the management core may be configured to identify the at least one type of objects based on the instructions.

At 1506, at least one computational core may be determined. The at least one computational core may be associated with the at least one type of objects. The at least one computational core may be determined by the at least one management core. For example, the at least one computational core may be determined by the at least one management core based on memory addresses of the at least one type of objects. For example, each computational core may be associated with a memory addresses range. The at least one computational core may comprise the particular computational core associated with at least one type of objects and associated with a memory range that is close to the data object's memory address. The data object's memory address may be used to directly identify a computational core that is capable of operating with the particular data object. The management core may send the instructions to the at least one computational core. At 1508, instructions of the algorithm may be sent to the at least one computational core. The instructions of the algorithm may be sent to the at least one computational core for execution.

Figure 16:
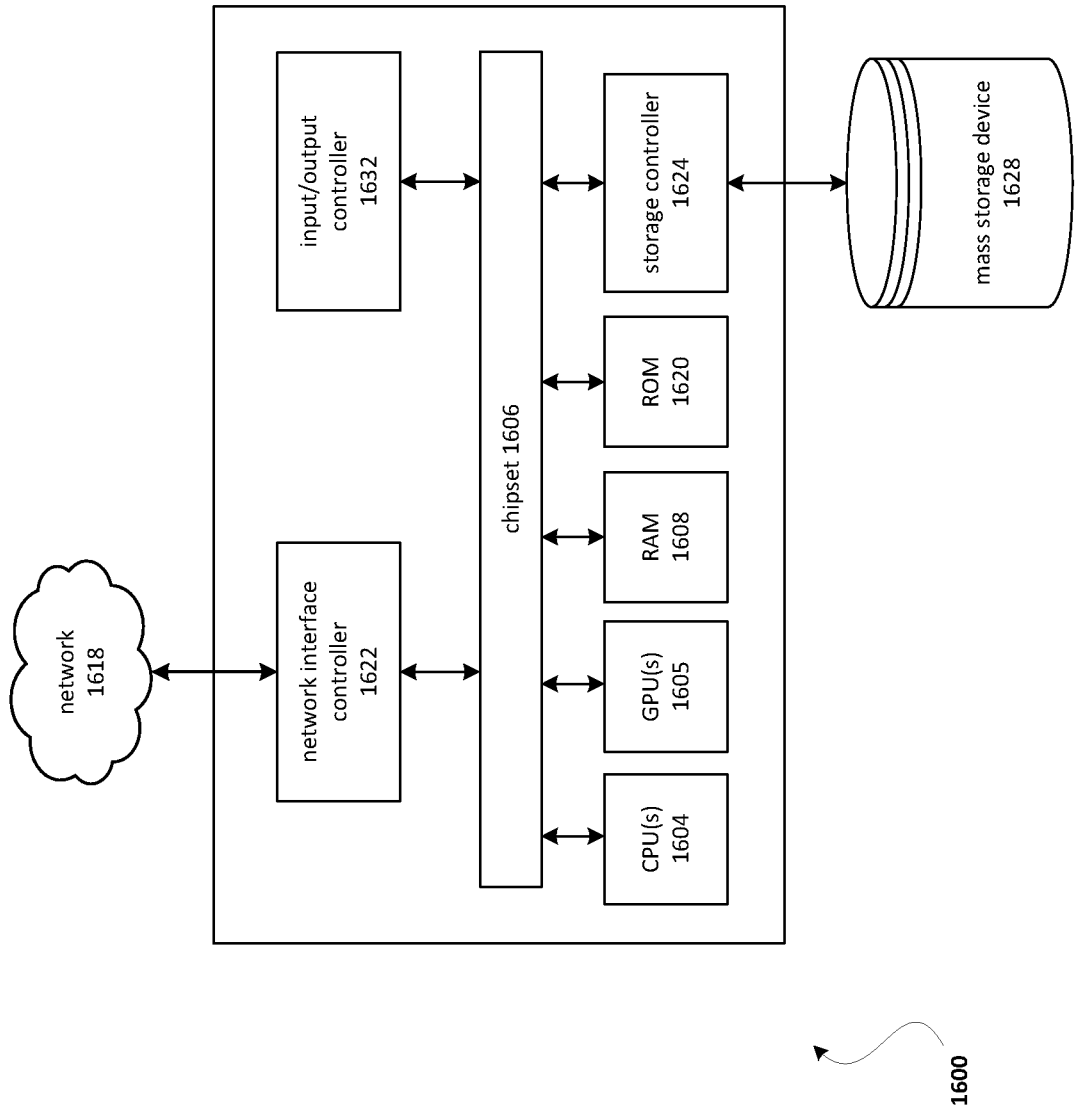
FIG. 16 shows an example computing device which may be used to perform any of the techniques disclosed herein.

FIG. 16 illustrates a computing device that may be used in various aspects, such as in any of the components depicted in FIGS. 1-10. The computer architecture shown in FIG. 16 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1600 may include a baseboard, or "motherboard," which is a printed circuit board to which a multitude of components or devices may be connected by way of a system bus or other electrical communication paths. One or more central processing units (CPUs) 1604 may operate in conjunction with a chipset 1606. The CPU(s) 1604 may be standard programmable processors that perform arithmetic and logical operations necessary for the operation of the computing device 1600.

The CPU(s) 1604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1604 may be augmented with or replaced by other processing units, such as GPU(s) 1605. The GPU(s) 1605 may comprise processing units specialized for but not necessarily limited to highly parallel computations, such as graphics and other visualization-related processing.

A chipset 1606 may provide an interface between the CPU(s) 1604 and the remainder of the components and devices on the baseboard. The chipset 1606 may provide an interface to a random-access memory (RAM) 1608 used as the main memory in the computing device 1600. The chipset 1606 may further provide an interface to a computer-readable storage medium, such as a read-only memory (ROM) 1620 or non-volatile RAM (NVRAM) (not shown), for storing basic routines that may help to start up the computing device 1600 and to transfer information between the various components and devices. ROM 1620 or NVRAM may also store other software components necessary for the operation of the computing device 1600 in accordance with the aspects described herein.

The computing device 1600 may operate in a networked environment using logical connections to remote computing nodes and computer systems through local area network (LAN). The chipset 1606 may include functionality for providing network connectivity through a network interface controller (NIC) 1622, such as a gigabit Ethernet adapter. A NIC 1622 may be capable of connecting the computing device 1600 to other computing nodes over a network 1616. It should be appreciated that multiple NICs 1622 may be present in the computing device 1600, connecting the computing device to other types of networks and remote computer systems.

The computing device 1600 may be connected to a mass storage device 1628 that provides non-volatile storage for the computer. The mass storage device 1628 may store system programs, application programs, other program modules, and data, which have been described in greater detail herein. The mass storage device 1628 may be connected to the computing device 1600 through a storage controller 1624 connected to the chipset 1606. The mass storage device 1628 may consist of one or more physical storage units. The mass storage device 1628 may comprise a management component. A storage controller 1624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1600 may store data on the mass storage device 1628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1628 is characterized as primary or secondary storage and the like.

For example, the computing device 1600 may store information to the mass storage device 1628 by issuing instructions through a storage controller 1624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1600 may further read information from the mass storage device 1628 by detecting the physical states or characteristics of one or more particular locations within the physical storage units.

In addition to the mass storage device 1628 described above, the computing device 1600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1628 depicted in FIG. 16, may store an operating system utilized to control the operation of the computing device 1600. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1628 may store other system or application programs and data utilized by the computing device 1600.

The mass storage device 1628 or other computer-readable storage media may also be encoded with computer-executable instructions, which, when loaded into the computing device 1600, transforms the computing device from a general-purpose computing system into a special-purpose computer capable of implementing the aspects described herein. These computer-executable instructions transform the computing device 1600 by specifying how the CPU(s) 1604 transition between states, as described above. The computing device 1600 may have access to computer-readable storage media storing computer-executable instructions, which, when executed by the computing device 1600, may perform the methods described herein.

A computing device, such as the computing device 1600 depicted in FIG. 16, may also include an input/output controller 1632 for receiving and processing input from a number of input devices, such as a keyboard, a mouse, a touchpad, a touch screen, an electronic stylus, or other type of input device. Similarly, an input/output controller 1632 may provide output to a display, such as a computer monitor, a flat-panel display, a digital projector, a printer, a plotter, or other type of output device. It will be appreciated that the computing device 1600 may not include all of the components shown in FIG. 16, may include other components that are not explicitly shown in FIG. 16, or may utilize an architecture completely different than that shown in FIG. 16.

As described herein, a computing device may be a physical computing device, such as the computing device 1600 of FIG. 16. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method, comprising:
    detecting data objects based on source code and identifying a data type of each of the data objects from a plurality of data types by a compiler;
    defining a plurality of streams each of which comprises a container configured to store data objects of only a particular data type among the plurality of data types;
    detecting a plurality of sets of operations, wherein each of the plurality of sets of operations is to be applied to a corresponding one of the plurality of data types;
    creating a plurality of computational cores in a field-programmable gate array (FPGA) based on the plurality of sets of operations, wherein each of the plurality of computational cores is configured to apply at least one of the plurality of sets of operations on data objects of the corresponding one of the plurality of data types; and
    synthesizing a computational architecture based on the plurality of streams and the plurality of computational cores each of which is associated with at least one of the plurality of streams.

2. The method of claim 1, further comprising:
    creating the plurality of streams in a memory.

3. The method of claim 1, further comprising:
    processing data objects of the particular data type in a corresponding stream using one of the plurality of computational cores associated with the corresponding stream.

4. The method of claim 1, wherein the computational architecture further comprises at least one management core, wherein the at least one management core is configured to orchestrate an activity of associating the plurality of computational cores with the plurality of streams.

5. The method of claim 1, further comprising:
    executing an application based on the computational architecture, wherein the computational architecture comprises the plurality of streams, the plurality of computational cores, and at least one management core configured to orchestrate an activity of associating the plurality of computational cores with the plurality of streams.

6. The method of claim 5, further comprising:
    storing at least one object of the particular data type in a corresponding stream in response to an initiation by a thread of the application, wherein data objects in any of the plurality of streams are accessible based on memory addresses.

7. The method of claim 5, further comprising:
identifying data objects of at least one data type in response to an initiation of applying an algorithm from a thread of the application;
determining at least one computational core of the plurality of computational cores associated with the data objects of the at least one data type by the at least one management core; and
sending instructions of the algorithm to the at least one computational core for execution.

8. The method of claim 7, further comprising:
determining the at least one computational core based on memory addresses of the data objects of the at least one data type.

9. A system, comprising:
at least one processor; and
at least one memory comprising computer-readable instructions that upon execution by the at least one processor cause the system to perform operations comprising:
detecting data objects based on source code and identifying a data type of each of the data objects from a plurality of data types by a compiler;
defining a plurality of streams each of which comprises a container configured to store data objects of only a particular data type among the plurality of data types;
detecting a plurality of sets of operations, wherein each of the plurality of sets of operations is to be applied to a corresponding one of the plurality of data types;
creating a plurality of computational cores in a field-programmable gate array (FPGA) based on the plurality of sets of operations, wherein each of the plurality of computational cores is configured to apply at least one of the plurality of sets of operations on data objects of the corresponding one of the plurality of data types; and
synthesizing a computational architecture based on the plurality of streams and the plurality of computational cores each of which is associated with at least one of the plurality of streams.

10. The system of claim 9, the operations further comprising:
creating the plurality of streams in a memory.

11. The system of claim 9, the operations further comprising:
processing data objects of the particular data type in a corresponding stream using one of the plurality of computational cores associated with the corresponding stream.

12. The system of claim 9, wherein the computational architecture further comprises at least one management core, wherein the at least one management core is configured to orchestrate an activity of associating the plurality of computational cores with the plurality of streams.

13. The system of claim 9, the operations further comprising:
executing an application based on the computational architecture, wherein the computational architecture comprises the plurality of streams, the plurality of computational cores, and at least one management core configured to orchestrate an activity of associating the plurality of computational cores with the plurality of streams.

14. The system of claim 13, the operations further comprising:
identifying data objects of at least one data type in response to an initiation of applying an algorithm from a thread of the application;
determining at least one computational core of the plurality of computational cores associated with the data objects of the at least one data type by the at least one management core; and
sending instructions of the algorithm to the at least one computational core for execution.

15. A non-transitory computer-readable storage medium, storing computer-readable instructions that upon execution by a processor cause the processor to implement operations, the operation comprising:
detecting data objects based on source code and identifying a data type of each of the data objects from a plurality of data types by a compiler;
defining a plurality of streams each of which comprises a container configured to store data objects of only a particular data type among the plurality of data types;
detecting a plurality of sets of operations, wherein each of the plurality of sets of operations is to be applied to a corresponding one of the plurality of data types;
creating a plurality of computational cores in a field-programmable gate array (FPGA) based on the plurality of sets of operations, wherein each of the plurality of computational cores is configured to apply at least one of the plurality of sets of operations on data objects of the corresponding one of the plurality of data types; and
synthesizing a computational architecture based on the plurality of streams and the plurality of computational cores each of which is associated with at least one of the plurality of streams.

16. The non-transitory computer-readable storage medium of claim 15, the operations further comprising:
creating the plurality of streams in a memory.

17. The non-transitory computer-readable storage medium of claim 15, the operations further comprising:
processing data objects of the particular data type in a corresponding stream using one of the plurality of computational cores associated with the corresponding stream.

18. The non-transitory computer-readable storage medium of claim 15, wherein the computational architecture further comprises at least one management core, wherein the at least one management core is configured to orchestrate an activity of associating the plurality of computational cores with the plurality of streams.

19. The non-transitory computer-readable storage medium of claim 15, the operations further comprising:
executing an application based on the computational architecture, wherein the computational architecture comprises the plurality of streams, the plurality of computational cores, and at least one management core configured to orchestrate an activity of associating the plurality of computational cores with the plurality of streams.

20. The non-transitory computer-readable storage medium of claim 19, the operations further comprising:
identifying data objects of at least one data type in response to an initiation of applying an algorithm from a thread of the application;
determining at least one computational core of the plurality of computational cores associated with the data objects of the at least one data type by the at least one management core; and sending instructions of the algorithm to the at least one computational core for execution.

\* \* \* \* \*